May 30, 1972 C. M. ANDERSON Re. 27,380

FLOTATION MACHINE AND STATOR THEREFOR

Original Filed Jan. 25, 1965

PRIOR ART

INVENTOR.
CHARLES M. ANDERSON

BY Mallinckrodt and Mallinckrodt

ATTORNEYS

United States Patent Office

Re. 27,380
Reissued May 30, 1972

27,380

FLOTATION MACHINE AND STATOR THEREFOR

Charles M. Anderson, Salt Lake City, Utah, assignor to The Galigher Company, Salt Lake City, Utah Original No. 3,327,851, dated June 27, 1967, Ser. No. 427,639, Jan. 25, 1965. Application for reissue June 12, 1969, Ser. No. 4,551
(Filed under Rule 47(b) and 35 U.S.C. 118)
Int. Cl. B03d *1/18*
U.S. Cl. 209—169 9 Claims

Matter enclosed in heavy brackets [ ] appears in the original patent but forms no part of this reissue specification; matter printed in italics indicates the additions made by reissue.

*ABSTRACT OF THE DISCLOSURE*

*A flotation stator comprising a bubble peeler structure having a multiplicity of spaced stator blades radiating from and defining an impeller-receiving space and a bottom plate supportive of said blades with an opening below said impeller-receiving space configurated as the horizontal cross section of the interior of a flotation machine tank but somewhat smaller. The bubble peeler structure may have blades substantially uniform in length and relatively short compared to conventional bubble peeler blades.*

Figure 1:
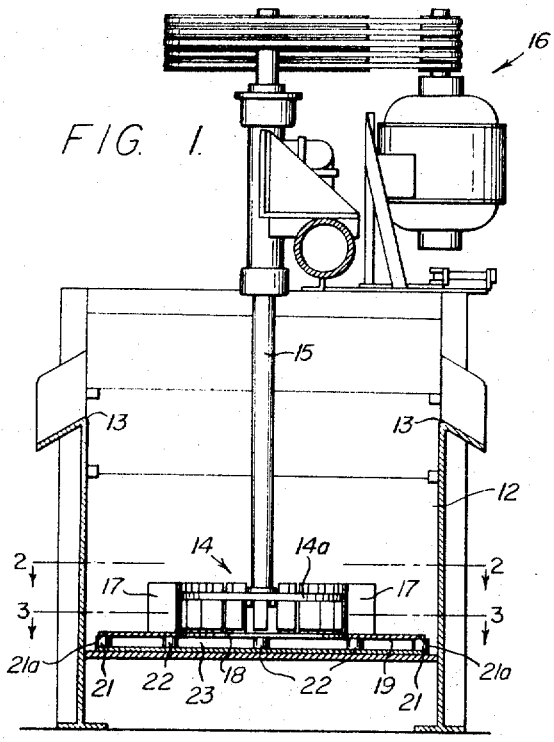

This invention relates to the type of sub-aeration flotation machine shown in U.S. Patents Nos. 2,055,065 and 2,182,442 granted to Lionel E. Booth under dates of Sept. 22, 1936, and Dec. 5, 1939, respectively, and also shown in improved form in U.S. Patents Nos. 2,673,724 and 2,767,964 granted to John T. Potts under dates of Mar. 30, 1954, and Oct. 23, 1956, respectively. This type of machine has long been manufactured by The Galigher Company of Salt Lake City, Utah, and is well known in the flotation art.

Flotation machines of this type are characterized by the combination of an aerating impeller, having a multiplicity of closely spaced fingers depending from the rim of an essentially closed top member, which is usually of disk formation as shown in the aforementioned Potts patents, and a concentric stator structure, comprising a multiplicity of mutually spaced blades or vanes extending radially of the impeller and circumferentially surrounding it. This mechanism is mounted near the bottom of a square tank adapted to contain metallurgical pulp and to form one cell in a series of such cells through which the pulp flows from one end of the series to the other.

The blades of the stator, or bubble peeler as it is sometimes called, have extended radially outwardly from the impeller to or almost to the walls of the flotation tank, and, therefore, have been of widely differing lengths, depending upon whether they are disposed at the corners of the tank or intermediate the corners.

In accordance with the present invention, the stator blades are shortened considerably in their outward extension from the impeller and are all of the same or substantially the same length, to provide a ring closely encircling the impeller. They are mounted on and rise from a square bottom plate, which is spaced upwardly from the bottom of the tank and extends almost to the walls thereof to positively direct the pulp to the outer reaches of the tank for recirculation around and below such bottom plate. It has been found that the shorter blades satisfactorily stabilize and direct the circulating pulp and that the relatively greater speed of pulp flow which is thereby insured and the greater unrestricted area below the bubble column which is thereby attained make for significantly improved operation.

There is shown in the accompanying drawings a specific embodiment of the invention representing what is presently regarded as the best mode of applying it in actual practice. From the detailed description of this illustrated form, various specific objects and features of the invention will become apparent.

Figure 2:
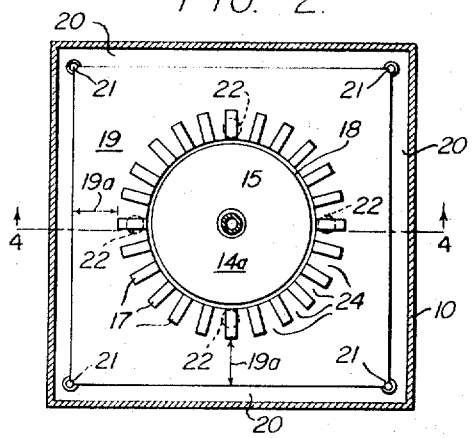
Figure 3:
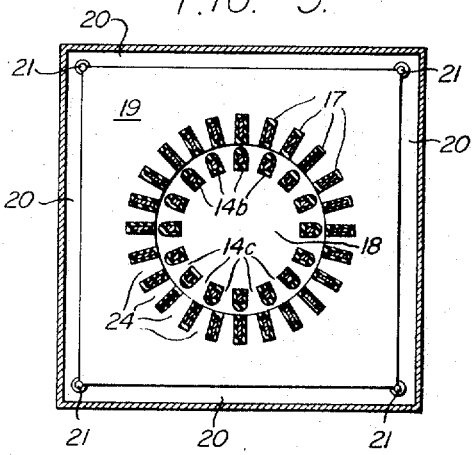
Figure 5:
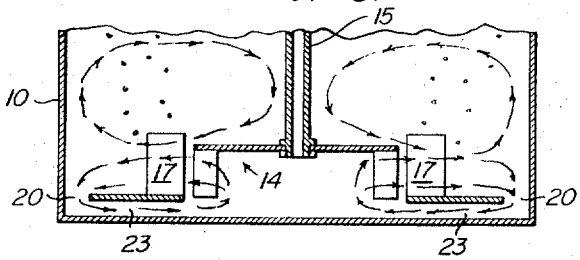
Figure 4:
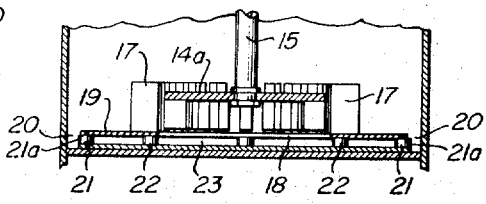
Figure 6:
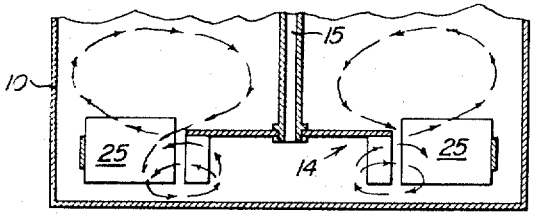

In the drawings:

FIG. 1 represents a central vertical section taken through a flotation cell conforming to the invention, the impeller and drive assembly therefor being shown in elevation;

FIG. 2, a horizontal section taken along the line 2—2 of FIG. 1 and leaving out exterior structural details;

FIG. 3, a similar horizontal section taken along the line 3—3 of FIG. 1;

FIG. 4, a fragmentary vertical section taken along the line 4—4 of FIG. 2;

FIGS. 5 and 6, enlarged, fragmentary, schematic views in central vertical section showing, respectively, the present improvement in contrast to the prior construction, particularly as concerns pulp recirculation, which is indicated by appended arrows.

Referring to the drawings:

The illustrated flotation machine is typical of the type previously referred to, being provided with a square flotation tank 12 having the usual provision for pulp inflow and the tailings outflow (not shown) and the usual froth overflow lips. The customary aerating impeller 14 is mounted at the lower end of the usual hollow impeller shaft 15 for rotation by the conventional power drive arrangement indicated generally by the reference number 16.

The impeller 14 is conventional and comprises a closed top member 14a of flat disk formation and a circumferential series of closely spaced fingers 14b depending from the rim of top member 14a. Air entering the impeller from shaft 15 mixes with pulp entering from the open bottom of the impeller, and the mixture is discharged laterally through the multiplicity of side-discharge ports 14c, FIG. 3, formed by the circumferential series of spaces between the depending fingers of the impeller.

The unique stator or peller blade structure which characterizes this new flotation machine comprises, in the illustrated embodiment, a multiplicity of mutually spaced blades 17 radiating outwardly from and defining a circular space 18, FIG. 2, for the reception of impeller 14. The blades 17 are interconnected by and rise from rigid securement, as by welding, to the upper surface of a bottom plate 19, configurated to conform generally with the horizontal cross-sectional configuration of the interior of tank 10 but being somewhat smaller so as to provide peripheral, pulp-recirculation passages 20 between the outer edges of such bottom plate and the side walls of the tank when the stator is installed in the tank.

The stator is spaced above the bottom of tank 10 by sets of feet 21 and 22, respectively, FIGS. 2 and 4, so bottom plate 19 thereof is raised sufficiently above the bottom of the tank to provide a bottom, recirculation space or passage 23. The feet 21 are fastened to and rise from the bottom of the tank, as by welding, and have seats 21a for receiving notched corners of the stator plate 19, so that such plate rests freely thereon. The feet 22 are fastened to and depend from the underside of stator plate 19 peripherally of the inner circumferential edge thereof which defines impeller-receiving space 18. They rest freely on the bottom of the tank. Thus, the entire stator unit can be easily lifted out of the tank for repair or replacement.

As illustrated, the basic steel structure is faced with wear-resistant rubber of the like in customary manner wherever exposed to abrasive action of the pulp.

The stator blades 17, as previously mentioned, are horter than the corresponding blades of the conventional tator and are of substantially equal length to provide an nnulus, which closely encircles impeller-receiving space 8 and presents a circumferential series of stator passages 4 confronting the side-discharge ports 14c. Stator bot-om plate 19 extends from the inner ends of such blades, ubstantially at space 18, to short of the peripheral walls f the tank in order to define the pulp-recirculation pas-ages 20. Blades 17 are substantially no longer than about ne-half the widths of the narrowest portions of the plate 9 lying between opening 18 and the outer periphery of ach plate, so as to properly stabilize the aerated pulp ischarged by the impeller, without reducing its velocity ny more than can be avoided.

As indicated by the appended arrows in FIGS. 5 and 6, espectively, circulation of pulp in the arrangement of the ivention is completely through the stator passages 24 nd on out over the unencumbered outer margins of ator bottom plate 19, downwardly through peripheral ulp-recirculation passages 20, and back to the impeller irough bottom space or passage 23, while, in the con-entional arrangement, circulation tends to be localized ithin a relatively short circuit largely within the confines f the usual stator plates 25, FIG. 6.

Comparative tests between these arrangements have iown that of the invention to be significantly superior. hus, in typical examples, where the tests were carried ut under identical conditions on a metallurgical pulp ith the following screen analysis:

| creen size: | Percent of total |
|---|---|
| +20 | 0.2 |
| −20 +28 | 0.8 |
| −28 +35 | 4.5 |
| −35 +48 | 12.2 |
| −48 +65 | 18.0 |
| −65 +100 | 15.7 |
| −100 +150 | 15.1 |
| −150 +200 | 8.5 |
| −200 | 25.0 |
| Total | 100.0 |

ie following results were obtained:

EXAMPLE I.—60″ CELL PERFORMANCE COMPARISON

| | Solids to surface, percent average | | Max. sanding in corners, inches | |
|---|---|---|---|---|
| eet per minute ripheral speed | Plate type stator | Std. stator | Plate type stator | Std. stator |
| 210 | 23.7 | 21.6 | 2⅝ | 5¾ |
| 310 | 26.9 | 24.6 | 2⅜ | 5½ |

EXAMPLE II.—48″ CELL PERFORMANCE COMPARISON

| | Solids to surface, percent average | | Max. sanding in corners, inches | |
|---|---|---|---|---|
| eet per minute ripheral speed | Plate type stator | Std. stator | Plate type stator | Std. stator |
| 050 | 28.6 | 25.6 | ¾ | 3 |
| 210 | 29.4 | 26.7 | 0 | 2 |

In addition to the above, it should be noted that, ignificantly less steel and rubber are required for the onstruction of the invention as against the conventional onstruction.

Whereas there is here illustrated and described a cer-ain preferred construction which is presently regarded s the best mode of carrying out the invention, it should e understood that various changes may be made without eparting from the disclosed inventive subject matter par-cularly pointed out and claimed herebelow.

I claim:

1. In a flotation machine of type which includes a otation tank having a bottom and peripheral walls; an npeller rotatably mounted in the tank adjacent to but paced above the bottom thereof, said impeller having a top member of substantially closed, circular formation, and a multiplicity of closely spaced fingers depending from the rim of the top member in mutually spaced relationship to define a plurality of side-discharge ports, the bottom of the impeller being substantially entirely open; and a stator in the form of peeler blade structure made up of a multiplicity of mutually spaced blades spaced above the bottom of the tank and radiating outwardly from and defining a circular space within which the impeller is mounted for rotation on a vertical axis concentric with the axis of the stator, the improvement comprising:

a bottom plate for the stator spaced above the bottom wall of the tank and having an opening therethrough substantially concentric with said circular space, said bottom plate extending short of the peripheral walls of the tank by enough space to provide for pulp circulation from above the below the plate;

the said blades being fixed in position on said plate and being substantially uniform in length and extending outwardly substantially no more than about one-half the width of the plate at any point between the impeller and the outer periphery of said plate and, collectively, defining a relatively narrow-walled annulus closely surrounding the impeller.

2. The improvement defined by claim 1, wherein the bottom plate of the stator is secured to the bottom edges of the stator blades as an integral part of the stator as-assembly.

3. The improvement defined by claim 2, wherein the stator assembly is freely supported on the bottom of the tank.

4. The improvement defined by claim 1, wherein the tank is square and the bottom plate of the stator is square.

5. A flotation machine stator, comprising a multiplicity of mutually spaced stator blades radiating outwardly from and defining a circular space for the reception of a flotation impeller; a bottom plate having an opening therethrough substantially concentric with said circular space, said blades being fixedly secured to said plate and being substantially uniform in length and extending outwardly substantially no more than about one-half the width of the plate at any point between said space and the outer periphery of the bottom plate and, collectively, defining a relatively narrow-walled annulus closely surrounding said space; and means for supporting said bottom plate above the bottom of a flotation tank.

*6. A flotation machine comprising:*

*a tank having a bottom and peripheral walls;*

*a bottom plate of substantially the same horizontal cross-sectional configuration as the tank but somewhat smaller in each horizontal direction, mounted above and approximately parallel the bottom of said tank to provide narrow circulation passages between said bottom plate and the peripheral walls around substantially the entire perimeter of said bottom plate and between said bottom plate and the bottom of said tank, said plate having a centrally disposed opening therethrough;*

*a multiplicity of stator blades mounted on top of said bottom plate to radiate from and define an impeller-receiving space above said opening in said plate; and*

*an impeller, mounted to rotate within said impeller-receiving space.*

*7. A flotation machine in accordance with claim 6 wherein the tank is square in horizontal cross section.*

*8. A flotation machine in accordance with claim 6 wherein the opening through said bottom plate is substantially concentric with said impeller-receiving space and larger than said impeller.*

*9. A flotation machine in accordance with claim 6 wherein the bottom plate extends closer to the tank walls than the individual stator blades.*

(References on following page)

References Cited

The following references, cited by the Examiner, are of record in the patented file of this patent or the original patent.

UNITED STATES PATENTS

| | | | |
|---|---|---|---|
| 2,198,143 | 4/1940 | Weinig | 261—87 |
| 2,767,964 | 10/1956 | Potts | 209—169 X |
| 2,875,897 | 3/1959 | Booth | 261—87 X |

| | | | |
|---|---|---|---|
| 2,393,976 | 2/1946 | Daman et al. | 261—93 X |
| 2,609,097 | 9/1952 | Dering | 261—87 X |

FRANK W. LUTTER, Primary Examiner

R. J. HILL, Assistant Examiner

U.S. Cl. X.R.

209—170; 261—87, 93